Feb. 12, 1963  K. NEUMANN  3,077,036
TEMPERATURE RESPONSIVE FREEZE DRYING
METHOD AND APPARATUS
Filed Jan. 8, 1960
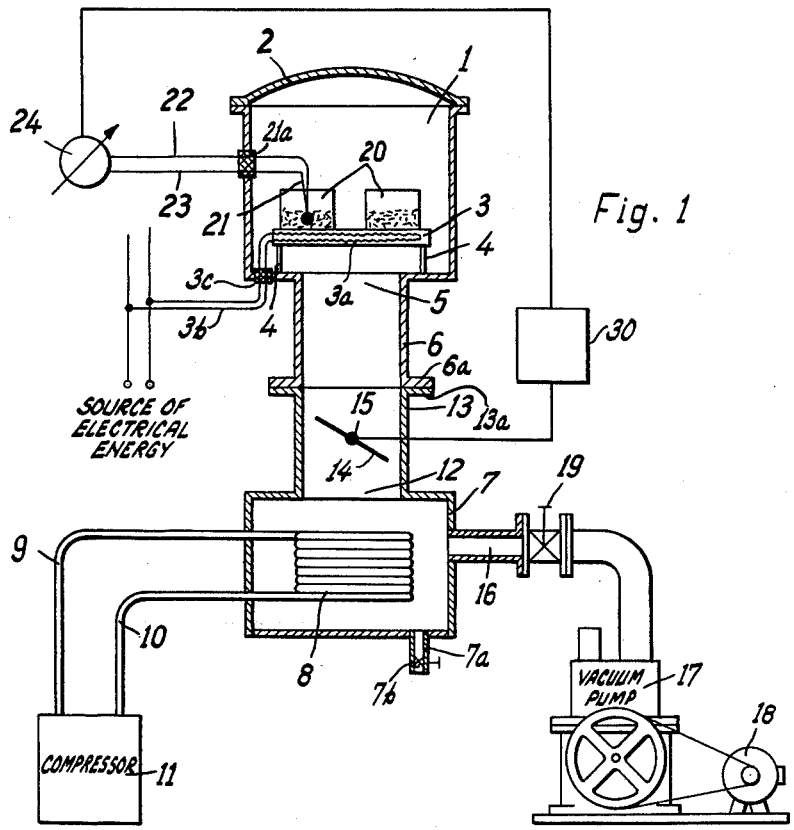
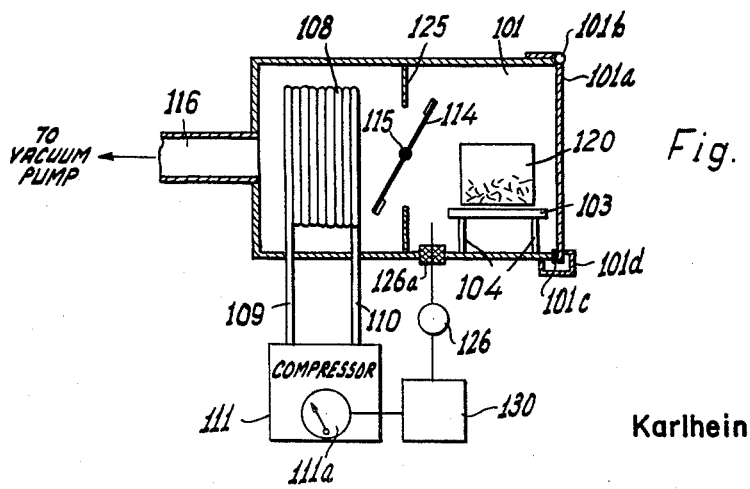
INVENTOR
Karlheinz Neumann
BY George H. Spencer
ATTORNEY

United States Patent Office 3,077,036
Patented Feb. 12, 1963

3,077,036
TEMPERATURE RESPONSIVE FREEZE DRYING
METHOD AND APPARATUS
Karlheinz Neumann, Koln-Bayental, Germany, assignor to Leybold-Hochvakuum-Anlagen G.m.b.H., Koln-Bayental, Germany
Filed Jan. 8, 1960, Ser. No. 1,297
Claims priority, application Germany Jan. 10, 1959
11 Claims. (Cl. 34—5)

The present invention relates to a method of operating a vacuum drying chamber in which the water is sublimated from the frozen material to be dried to an ice condenser, while at the same time the material is heated by a heating device.

The present invention further relates to apparatus for carrying out such a method.

Heretofore, it has been assumed, in the art of freeze-drying, that the drying process can be carried out most quickly if the partial pressure of the water vapor in the drying chamber is kept as low as possible, i.e., if for all intents and purposes, a high vacuum is maintained. This assumption is based on the premise that the frozen material is at first dried at its outer surface, so that at the interior of the material, there is an ice-containing core which is surrounded by a dry layer the thickness of which increases during the freeze-drying process. Therefore, as the drying process progresses, the sublimating water must pass through a constantly thicker layer of the already dried material, and this produces a substantial resistance to diffusion and therefore an appreciable loss of pressure. Analytical examinations have shown that under adverse conditions the pressure loss due to the throttling effect of the already dry layer of the material can be so high that only about 1/1000 of the pressure prevailing above the surface being sublimated is effective.

Accordingly, it has been sought to maintain the temperature of the ice condenser as low as possible so as to expedite the sublimation process by a great pressure differential. Attempts along these lines have resulted in the use of economically unfeasible and impractical measures for holding down the partial pressure of the water vapor in the vacuum drying chamber, by keeping the surface temperature of the condenser very low. To this end, efforts have also been made to make the pressure in the vacuum drying chamber as close as possible to this very low partial pressure of the water vapor in the condenser chamber. As a result, multiple stage compressor units were used, but these are expensive and unreliable so that if one has to resort to using such machinery, the operating costs of the drying installations are substantially increased.

Furthermore, it has been suggested to place the drying chamber and the condenser chamber in communication with each other by conduits means of as large a cross-section as possible, including conduits of up to 60 cm. cross-section, but this requires special sealing means in order to provide adequate air-tightness for such large conduits.

With the state of the art being that as described above, applicant has realized that a freeze-drying installation must be considered not solely in the light of a large temperature differential between the frozen material to be dried and the surface of the ice condenser, and that in order to provide an economically feasible freeze-dryer another important factor must be considered, namely, the flow of heat for equalizing the cold due to evaporation.

It is known that about 700 Kcal. of heat are required for the sublimation of 1 kg. of ice. Unless this quantity of heat is supplied from outside, it is extracted from the ice, which cools down in the process, till sublimation is retarded or stopped altogether. This relatively large quantity of heat must be supplied to the frozen material in such a manner that both thawing of the ice containing core and overheating of the already dry outer layers are avoided with certainty.

Moreover, it is well known that the temperature in the ice containing core of the substance to be dried must not exceed a maximum value characteristic of the material in question, otherwise the frozen material would thaw. The maximum admissible temperatures in the ice containing core vary widely depending upon the nature of the substance in question. Thus, for example, the maximum admissible temperature is $-7°$ C. in the case of chicken, $-18°$ C. in the case of Staphylococci cultures, whereas certain fruit juices and virus cultures can only be dried at temperatures below $-25°$ to $-30°$ C. without risk of thawing or of damage to the substance (cf. German Patent 1,038,988).

But even the already dry external layer of the substance to be dried is highly sensitive to temperature. Although this dry layer is no longer capable of thawing, it will also not get cooled by loss of heat of sublimation. This means that the already dry outer layers may almost acquire the temperature of the heating elements or of the heatable supports in the drying chamber. This sets a limit to the maximum possible temperatures of the heating elements or of the supports.

The maximum admissible temperature in the ice-containing core of a substance to be freeze-dried may be found in the following manner:

(1) By measuring the temperature in the ice containing core for which partial liquefaction of the frozen material sets in, which is recognized from the formation of bubbles or the foaming of the substance, or (2) By drying successive batches of the substances in question at progressively higher core temperatures, and thereafter testing them for the preservation of the required property (such as solubility in water, or survival of bacteria) in an empirical manner. In this procedure, the temperature of the ice containing core is measured with a thermocouple or rather, in the manner described in German Patent 1,038,988.

The maximum admissible surface temperature of the heating elements or of the heatable supports is best found empirically in a similar manner.

These explanations show that the drying speed and thus the economy and safety of the process cannot be adequately controlled by selecting a suitable temperature of the heating elements or of the heatable supports, as for economic freeze drying there is hardly any temperature interval available here. Either the temperature of the heating elements or of the supports remains below the maximum admissible value: then an amount of heat smaller than the optimum amount is supplied to the substance to be dried; or the temperature of the heating elements or of the supports is increased beyond the maximum admissible value: then there is the risk of damaging the substance to be freeze-dried. Thus it became necessary to look for other means of adjusting an optimum temperature in the interior of the substance to be dried, over and beyond the means available by adjusting the temperature of the heating elements or the heatable supports.

Detailed investigations have shown that the quantity of heat supplied to the material to be dried for a given, constant temperature of the heating elements or heatable supports depends to a very high degree upon the pressure inside the drying chamber, i.e. on the number of molecules per unit volume. The larger the number of molecules present per unit volume, the larger is the quantity of heat supplied to the material to be dried from the heating elements or heatable supports by direct transport of heat (convection). Thus the essential technical point of the invention consists in controlling the temperature of the material to be dried by means of the pressure in the drying chamber.

As the quantity of heat transferred by radiation and by conduction is not adversely affected by increasing the pressure in the drying chamber, the surprising fact results that in this manner a much larger quantity of heat may be supplied to the material to be dried without increasing the temperature of the heating elements or of the heatable supports. Moreover, this gives a possibility of controlling the temperature of the material to be dried by means of the pressure in the drying chamber. This type of control is used for adjusting an optimum temperature of the material to be dried. The time lag involved is much smaller than when controlling the temperature of the material to be dried by means of the temperature of the heating elements or of the heatable supports.

In theory, it is equally possible to control the pressure in the drying chamber by means of condensible and of non-condensible gases (such as air). In practice, however, it is advisable to vary the partial pressure of water vapour, which is easily achieved by corresponding condenser elements.

It is, therefore, an object of the present invention to overcome the above disadvantages and to provide a method and apparatus for expediting the drying process, and, with this object in view, the present invention resides in a drying process in which the pressure in the vacuum drying chamber is controlled as a function of the temperature of the material being dried, in such a manner that each batch is maintained at substantially a predetermined optimum drying temperature, which predetermined optimum drying temperature is so selected that when the material is kept at such temperature, the heat flow to the material corresponds to the cold due to evaporation which is produced by the sublimation, which cold results at the maximum permissible temperature of the frozen material.

The present invention further resides in a drying apparatus which comprises means forming an hermetic enclosure, a condenser arranged in the enclosure and occupying part of the space therewithin, and means for varying the cross-sectional area between the part of the space occupied by the condenser and the remainder of the space within the enclosure.

Additional objects and advantages of the present invention will become apparent upon consideration of the accompanying drawings in which:

FIGURE 1 is a diagrammatic representation, partly in section, of one embodiment of a drying apparatus according to the present invention in which the drying method according to the present invention can be carried out.

FIGURE 2 is a diagrammatic representation, partly in section, of another embodiment of a drying apparatus according to the present invention.

Referring now to the drawings, and to FIGURE 1 thereof in particular, there is shown a drying apparatus comprising a vacuum drying chamber 1 having a removable cover 2, within which drying chamber there is arranged a support plate 3 resting on legs 4. The support plate 3 is heated by an electric heating element 3a which is connected via leads 3b passing through a sealing bead 3c to a suitable source of electrical energy.

The drying chamber 1 is formed with a circular opening 5 which is the mouth of a downwardly directed connecting conduit 6 having a flanged end 6b.

The drying apparatus further includes a chamber 7 which houses a condenser coil 8 whose supply and discharge tubes pass through the walls of the chamber 7 and communicate with a compressor 11. In order to allow the drainage of condensate, the chamber 7 is formed with an outlet stud 7a containing a closable valve 7b.

The chamber 7 is formed with a circular opening 12 which is the mouth of an upwardly directed connecting conduit 13, the latter having a flanged end 13a connected to the flanged end 6a of the downwardly directed conduit 6, thus placing the drying chamber 1 and the condenser chamber 7 in communication with each other to form a single hermetic enclosure.

Within the conduit 13 there is arranged an adjustable butterfly or throttling valve 14 which is mounted on an axle 15 that extends exteriorly of the conduit 13 through an appropriate sealing (not shown). Thus, upon rotation of the axle 15, the cross-sectional area of the conduit which places the chambers 1 and 7 in communication with each other may be varied. A suitable actuating element (not shown) may be attached to the axle 15 for this purpose.

The condenser chamber 7 also has a connecting stud 16 which places this chamber in communication with a vacuum pump 17 driven by a motor 18, a closure valve 19 being included for closing the communication between the chamber 7 and the vacuum pump 17.

The support plate 3 supports the containers 20 which hold the material to be dried. In order to measure the temperature of the ice-containing center or core part of the material, there is provided a thermocouple 21 whose leads 22 and 23 pass through the wall of the chamber 1 by way of a sealing bead 21a and are connected to a measuring instrument 24. The instrument is connected to the axle 15 of the butterfly valve 14 by way of an automatic control mechanism 30 so that the position of the valve 14 is regulated automatically in response to the temperature of the ice-containing core of the material being dried.

In the embodiment shown in FIGURE 2, the condenser coil 108 and the support plate 103 resting on legs 104 and carrying the containers 120 are located in the same chamber 101. The latter is formed with a swinging door 101a hinged at the top at 101b and cooperating at its lower edge with a sealing strip 101c secured to the housing, a clamping channel 101d being provided for pressing the door 101a against the sealing strip 101c.

The chamber 101 is divided into two parts by an hermetic partition wall 125 which incorporates an adjustable closure member 114 hinged at 115. The condenser coil 108 is located in one of the chamber parts and the material to be dried in the other. As in the previous embodiment, the chamber part housing the condenser coil 108 is formed with a connecting stud 116 by which the chamber is placed in communication with a vacuum pump.

The coil 108 has tubes 109 and 110 which communicate with the compressor 111, the latter having a suitable adjustment 111a which allows the surface temperature of the coil 108 to be varied. Furthermore, there is a pressure gauge 126 which protrudes through a sealing bead 126a into the chamber part housing the material to be dried, and this pressure gauge 126 is connected to the adjustment 111a of the compressor by way of an automatic control device 130 so that the surface temperature of the coil 108 can be varied automatically in response to the pressure indicated by the gauge 126.

As set forth above, according to the present invention the drying process is carried out in such a manner that the pressure in the vacuum drying chamber is controlled as a function of the temperature of the material being dried, and this is done as follows: each batch is maintained as nearly as possible at a certain predetermined optimum drying temperature, which predetermined optimum temperature is so selected that when the material is kept at such temperature, the heat flow to the material corresponds to the cold due to evaporation which is produced by the sublimation, which cold results at the maximum permissible temperature of the frozen material.

Thus, according to the present invention, the pressure in the drying chamber is no longer sought to be kept as low as possible, which result was heretofore obtained only by economically impractical means; instead, this pressure is allowed to be so high, depending on the temperature of the material to be dried, that the heat transfer due to convection contributes to the total heat flow to the ice-containing material. Another way of expressing this would be as follows: the sublimation of the ice from the material to be dried is controlled by the pressure in the vacuum chamber in such a manner that the cold due to evaporation is not greater than the heat supplied by the heating device. In this way, the frozen material will not be cooled unnecessarily, but remains at its maximum permissible upper temperature. In this way, the drying time is approximately half of that required in heretofore known freeze-drying processes.

The following table is intended as an example of the advantages associated with the use of the invention. In this table, freeze drying times for various substances are listed both for the case of freeze-drying in the conventional manner and for the case of freeze-drying according to the procedure which is the subject of the present invention.

TABLE

| substance | max. heating temperature, °C. | former method, hours | method according to the invention, hours |
| --- | --- | --- | --- |
| milk | +75 | 24 | 17 |
| cauliflowers (cooked) | +80 | 36 | 25.5 |
| Do. | +80 | 28 | 28 |
| carrots | +60 | 29.2 | 12.4 |
| beans | +60 | 14.5 | 10 |
| chicken meat | +45 | 34 | 22 |

The process according to the present invention can be practiced in two ways. In one case, the surface temperature of the ice condenser is varied (FIG. 2), whereas in the other, the effective cross-sectional area of the conduit means which place the drying chamber and the condenser in communication with each other is varied, such as by a suitable throttling valve (FIG. 1). The change in the surface temperature thus acts in the known manner to influence the partial pressure of the water vapor. During the drying process the temperature difference between the surface of the condenser and the ice-containing core changes constantly, because during the progressive drying the thickness of the layer of already dry material continuously increases and thus offers a greater resistance to diffusing, so that a greater temperature differential must be maintained if the material to be dried is to be maintained at the optimum drying temperature. By controlling the throttling valve a low partial pressure due to the water vapor can be obtained, but due to the throttling effect, this pressure is not equalized with that prevailing in the drying chamber so that in each of the two chambers there is a certain pressure differential of the partial pressure of the water vapor, depending on the setting of the throttling valve.

In order to carry out the process according to the present invention, it is essential that the temperature of the ice-containing material be known. To this end, any one of the various measuring instruments can be used, such as a thermocouple as shown in FIGURE 1. However, it is under certain circumstances preferable to obtain an indirect temperature measurement. This can be done by periodically closing off the drying chamber from the condenser, whereupon the temperature of the ice-containing material can be determined, with the help of appropriate reference tables and/or curves, by measuring the pressure increase at the end of the period during which the chambers are closed off from each other (cf. German Patent 1,038,988). The drier of FIGURE 2 is suited for this type of operation.

The pressure regulation dictated by the temperature can be controlled by the manual actuation of appropriate valves, in which case the operator will have to make use of a temperature and of a pressure gauge. This manual control can be eliminated by using the automatic control mechanism 30, 130, which may be made of conventional parts.

The above-described method can be carried out in the drying installation of FIGURE 1 in which there is an adjustable throttling valve in the conduit means which place the drying chamber and the condenser in communication with each other. If desired, the method can even be carried out in existing drying installation in which the condenser is located physically within the drying chamber. In that case an hermetic separating wall is placed between the condenser and the remainder of the drying chamber, which separating chamber incorporates an adjustable closure member, as shown in FIGURE 2.

*Example With Reference to FIGURE 1*

Blood plasma is to be freeze-dried. In preliminary experiments it has been found that the optimum temperature in the ice containing core is $-17°$ C. The layer that is already dry must not be heated above $+60°$ C. Drying is carried out in the type of device depicted in FIG. 1. After switching on vacuum pump 17 and compressor 11 the pressure in the drying chamber 1 drops to 0.1 torr (mm. Hg). The temperature of heatable support 3 is now adjusted at $+60°$ C. The temperature inside blood plasma 20 is checked with a thermocouple 21 which indicates that the temperature inside the ice containing core does not rise above $-26°$ C. By means of automatic device 30 the cross-section of throttling valve 14 is reduced as much as possible. Now the temperature inside the ice containing core is seen to rise progressively. As soon as the thermocouple indicates a temperature of $-17°$ C., automatic device 30 causes the throttling valve to open to 50% of its normal cross-section. The temperature of the ice containing core drops gradually. As soon as the temperature has dropped below $-19°$ C., automatic device 30 closes throttling valve 14 to 25% of its normal cross-section. At this adjustment of the throttling valve, the ice containing core retains a temperature of $-18°$ C. almost without variation throughout the next two hours. After two hours, the temperature inside the material to be dried has risen to $-17°$ C. Automatic device 30 causes the throttling valve to open to 50% of its normal cross-section. This causes the temperature in the material to be dried to drop and the throttling valve is closed to 25% of its normal cross-section as soon as the temperature in the ice containing core has dropped below $-19°$ C. The temperature again rises slowly up to $-17°$ C., when the throttling valve is again opened to 50% of its normal cross-section.

In this way the resistance to flow is varied by means of a throttling valve to maintain an optimum temperature inside the material to be dried and to prevent excessive heating of the outer layers till after sublimation of the last traces of water, the thermocouple indicates a large rise of temperature and throttling valve 14 can be opened fully.

*Example With Reference to FIGURE 2*

This example of application is based on FIG. 2 of the patent application. A ferment preparation 120 is to be freeze-dried. In preliminary experiments it was found that the maximum permissible temperature of the ice containing core was $-25°$ C. The maximum permissible temperature of the heating surfaces was found at $+40°$ C. The temperature inside the ice containing core of the material to be dried may be measured e.g. using the device described in German Patent 1,038,988 by measuring the saturation vapour pressure in the drying chamber while closing valve 114 between drying chamber and ice condenser for a short time. This rise of pressure is recorded by a pressure gauge 126 and the information supplied to automatic device 130. This automatic device then decides whether the temperature in the ice containing core is higher or lower than the optimum temperature and accordingly controls the working of compressor 111 and thus the temperature of the ice condenser 108.

After switching on the vacuum pumps, the automatically controlled 115 valve 114 hermetically seals vacuum chamber 101 from ice condenser 108 every 2½ minutes. During the first twelve minutes a pressure of more than 0.5 torr is recorded in the drying chamber. After 15 minutes, pressure gauge 126 registers a pressure of 0.4 torr when closing valve 114. At this instant, heatable support 103 is adjusted at the maximum admissible temperature of +40° C. Moreover, compressor 111 is so adjusted by automatic device 130 that the temperature in the ice condenser 108 rises gradually. After 25 minutes, a rise of pressure to 0.5 torr is recorded upon closing valve 114. This means that the temperature inside the ice containing core of ferment preparation 120 has reached −25° C. Automatic device 130 now increases the power of compressor 111, so that the temperature in the condenser coils 108 drops by a few degrees. The next determination of pressure rise 2½ minutes later again shows a pressure of 0.5 torr. This means that the temperature in the material to be dried has dropped to −27° C. Automatic device 130 now reduces the power of the refrigerating machine so that the temperature of the condenser coils does not drop further. At the next determination, the pressure has risen to 0.45 torr. The ice condenser power remains reduced. The next pressure determination shows a pressure of 0.5 torr. This means that −25° C. have been reached in the ice containing core. Automatic device 130 switches the compressor to higher power till the pressure gauge records 0.4 torr at the next determination of rise of pressure (corresponding to −27° C.), and the power of the compressor is reduced.

This procedure is repeated throughout the drying process till no more ice is contained in the substance to be freeze-dried and the drying process is complete.

I claim:

1. In a method of operating a freeze drying installation in which water is sublimated in a vacuum from the material to be dried to an ice condenser while the material is being heated by a heating device, the step of controlling the pressure in the vacuum drying chamber in response to the temperature of the material being dried for maintaining each batch at substantially a predetermined optimum temperature which predetermined optimum temperature is so selected that when the material is kept at such temperature, the heat flow to the material corresponds to the cold due to evaporation which is produced by the sublimation, which cold results at the maximum permissible temperature of the frozen material, said pressure being decreased when the temperature of the material rises and increased when the temperature of the material falls, whereby the temperature of the material being dried is, in turn, kept at the desired optimum level by said step of controlling the pressure in the vacuum drying chamber.

2. The method defined in claim 1 wherein said step of controlling said pressure is carried out by varying the surface temperature of the condenser, said pressure being increased by increasing said surface temperature and decreased by decreasing said surface temperature.

3. The method defined in claim 1 wherein said step of controlling said pressure is carried out by throttling the communication between the drying chamber and the condenser, said pressure being increased by decreasing the cross section of the said communication and decreased by increasing said cross section.

4. The method defined in claim 1 wherein said step of controlling said pressure is carried out by automatically varying the surface temperature of the condenser in response to the temperature of the material being dried, said pressure being increased by increasing said surface temperature and decreased by decreasing said surface temperature.

5. The method defined in claim 1 wherein said step of controlling said pressure is carried out by automatically throttling the communication between the drying chamber and the condenser, said pressure being increased by decreasing the cross section of the said communication and decreased by increasing said cross section.

6. In a freeze drying apparatus, the combination which comprises: means forming an hermetic enclosure; a vapor condenser arranged in said enclosure and occupying part of the space therewithin; a vacuum pump communicating with said part of the space occupied by said condenser for creating a pressure which is sufficiently low to allow a freeze drying operation to be carried out by the apparatus; means movable between different open positions for varying the cross-sectional area between said part of the space occupied by said condenser and the remainder of the space within said enclosure; and operating means responsive to the temperature in said remainder of the space for controlling said varying means, whereby the pressure prevailing within said remainder of the space is regulated and consequently the temperature of the material in said remainder is kept at the desired optimum level.

7. In a freeze drying apparatus, the combination which comprises: means forming a drying chamber; means forming a condenser chamber; a vapor condenser arranged in said condenser chamber; a vacuum pump communicating with said condenser chamber for creating a pressure which is sufficiently low to allow a freeze drying operation to be carried out by the apparatus; means placing said chambers in communication with each other; adjustable throttling valve means movable between different open positions and arranged in said means which place said chambers in communication with each other; and operating means responsive to the temperature in said drying chamber for controlling said throttling valve means in such a manner that the pressure within said drying chamber is regulated so as to maintain the temperature of the material therein at the desired optimum level.

8. In a freeze drying apparatus, the combination which comprises: means forming a drying chamber; temperature-responsive means arranged in said drying chamber, said means being responsive to the temperature of the material to be dried and arranged in said drying chamber; means forming a condenser chamber; a vapor condenser arranged in said condenser chamber; a vacuum pump communicating with said condenser chamber for creating a pressure which is sufficiently low to allow a freeze drying operation to be carried out by the apparatus; conduit means placing said chambers in communication with each other; adjustable throttling valve means movable between different open positions and arranged in said conduit means; and means interconnecting said temperature-responsive means and said adjustable throttling valve means for automatically controlling the latter in response to the temperature of the material in said drying chamber such that said throttling means increases the cross section of said conduit means when the temperature of the material reaches a predetermined maximum and decreases said cross section when the temperature of the material reaches a predetermined minimum.

9. In a freeze drying apparatus, the combination which comprises: means forming an hermetic enclosure; a vapor condenser arranged in said enclosure and occupying part of the space therewithin; a vacuum pump communicating with said part of the space occupied by said condenser for creating a pressure which is sufficiently low to allow a freeze drying operation to be carried out by the apparatus; temperature-responsive means arranged in said enclosure, said means being responsive to the temperature of material to be dried and arranged in the remainder of the space within said enclosure; adjustable throttling means movable between different open positions for varying the cross-sectional area between said part of the space occupied by said condenser and said remainder of the space withtin said enclosure; and means interconnecting said temperature-responsive means and said adjustable throttling means for automatically controlling the latter in response to the temperature of the material in said remainder of the space within said enclosure such that said throttling means increases said cross-sectional area when the temperature of the material reaches a predetermined maximum and decreases said cross-sectional area when the temperature of the material reaches a predetermined minimum.

10. In a freeze drying apparatus, the combination which comprises: means forming an hermetic enclosure; a vapor condenser arranged in said enclosure and occupying part of the space therewithin; a vacuum pump communicating with said part of the space occupied by said condenser for creating a pressure which is sufficiently low to allow a freeze drying operation to be carried out by the apparatus; means for varying the surface temperature of said condenser; temperature-responsive means arranged in said enclosure, said last-mentioned means being responsive to the temperature of material to be dried and arranged in the remainder of the space within said enclosure; and means interconnecting said temperature-responsive means and said means for varying the surface temperature of said condenser for automatically controlling the latter in response to the temperature of the material in said remainder of the space within said enclosure such that the surface temperature of said condenser is decreased when the temperature of the material reaches a predetermined maximum and is increased when the temperature of the material reaches a predetermined minimum.

11. In a freeze drying apparatus, the combination which comprises: means forming a chamber; an hermetic partition wall dividing said chamber into two parts, said partition wall incorporating an adjustable closure member movable between different open positions; a vapor condenser arranged in one of said chamber parts, the other of said chamber parts being adapted to receive material to be dried; a vacuum pump communicating with said one chamber part for creating a pressure which is sufficiently low to allow a freeze drying operation to be carried out by the apparatus; and operating means responsive to the temperature in said other chamber for controlling said adjustable closure member in such a manner that the pressure within said other chamber is regulated so as to maintain the temperature of the material therein at the desired optimum level.

References Cited in the file of this patent

UNITED STATES PATENTS

| | | |
|---|---|---|
| 942,150 | Tiemann | Dec. 7, 1909 |
| 2,172,916 | Vidal | Sept. 12, 1939 |
| 2,199,815 | Flosdorf | May 7, 1940 |
| 2,268,769 | Newton | Jan. 6, 1942 |
| 2,343,467 | McGrath | Mar. 7, 1944 |
| 2,432,587 | Ramsey | Dec. 16, 1947 |
| 2,438,120 | Freygang | Mar. 23, 1948 |
| 2,441,730 | Strumia | May 18, 1948 |
| 2,442,114 | Brown | May 25, 1948 |
| 2,462,279 | Passman | Feb. 22, 1949 |
| 2,564,475 | Fischer | Aug. 14, 1951 |
| 2,731,734 | Bancroft | Jan. 24, 1956 |
| 2,994,132 | Neumann | Aug. 1, 1961 |